Oct. 11, 1927.
J. H. McFARLAND
1,645,440
MACHINE FOR SIMULTANEOUSLY DRYING AND POLISHING BEANS AND THE LIKE
Filed March 3, 1927
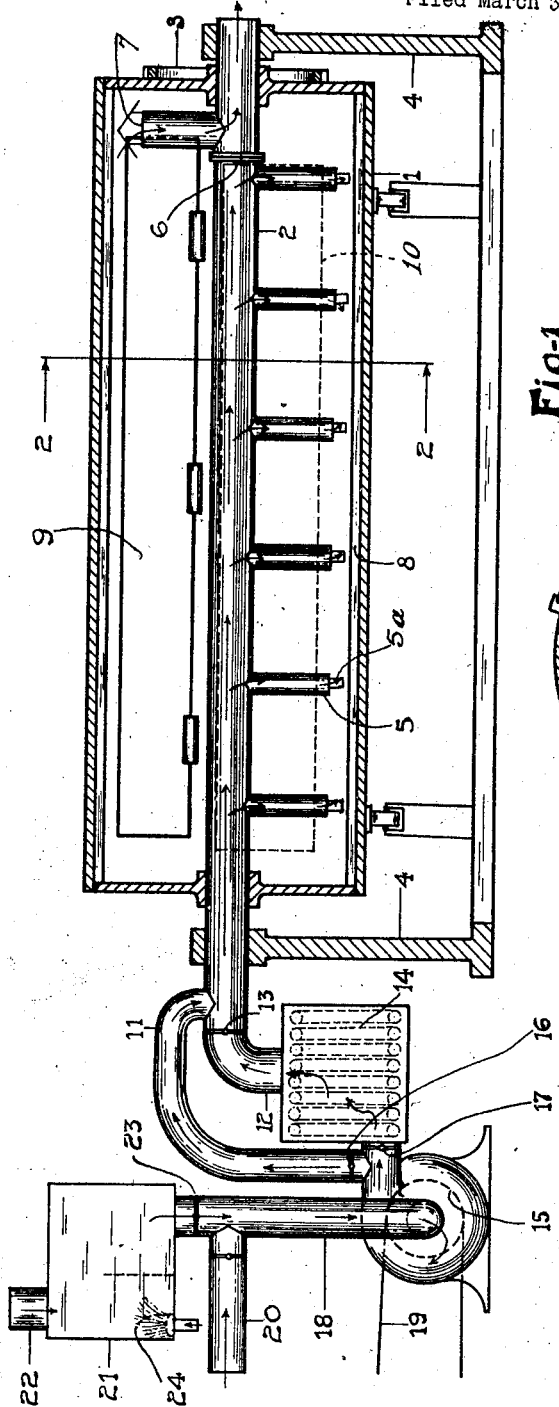
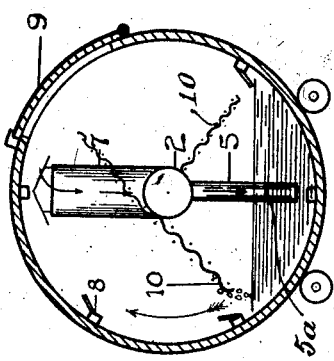
INVENTOR
JOHN H. McFARLAND
BY George B. Willcox
ATTORNEY Patented Oct. 11, 1927.

1,645,440

UNITED STATES PATENT OFFICE.

JOHN H. McFARLAND, OF MERRILL, MICHIGAN, ASSIGNOR OF ONE-FOURTH TO FRANK B. WALCOTT, OF WHEELER, MICHIGAN.

MACHINE FOR SIMULTANEOUSLY DRYING AND POLISHING BEANS AND THE LIKE.

Application filed March 3, 1927. Serial No. 172,283.

This invention relates to machines for drying and polishing beans and the like and pertains more particularly to a novel construction and mode of operation whereby the two operations of drying and polishing, as well as the conditioning of the material with respect to its brittleness, or the moisture content of its exterior surfaces, are all carried on at one operation.

The invention includes means for agitating the material to be dried in contact with a suitable scouring or polishing substance, pouring and stirring the material, agitating it in the presence of several air currents that not only dry it, or moisten it as the case may be, but also carry away the light powdery dust, thus expediting the polishing operation.

The invention also includes a means for supplying at will any suitable degree of humidity or temperature, and it also includes an improved baffling and screening device for the material, whereby the smaller particles are temporarily aerated while separated from the larger material which is being dried.

With the foregoing and certain other objects in view, which will appear later in the specifications, my invention comprises the devices described and claimed and the equivalents thereof.

In the drawings Fig. 1 is a diagrammatic part sectional longitudinal view of the machine.

Fig. 2 is a transverse section on the line 2—2 of Fig. 1.

The preferred construction of the machine will now be described in detail.

A drum 1 is mounted to revolve about a stationary tubular shaft 2. The drum, which is preferably supported by rollers, holds the beans or other material to be dried and polished and also a quantity of granular polishing material, which is preferably coarsely ground split or otherwise defective beans, such material having been found in practice to be a very suitable abrasive, absorptive and polishing agent. The drum is driven in any suitable manner, as by a gear 3, and the stationary tubular shaft 2 is supported on pedestals 4, 4.

Communicating with the drum shaft are a number of downwardly directed air discharge nozzles 5 that extend toward the lower periphery of the drum and close to, or even into the material, shown by the shaded area in Fig. 2. A partitioning means, such as a blank flange 6, is provided in shaft 2 for separating the air inlet end of the shaft from its outlet end.

The air or vapor vent from the drum is preferably a tube 7 extending up from the tubular shaft 2 to near the upper periphery of the drum so as to secure as great distance as possible for the air to travel from the inlet to the outlet. The interior of the drum may be fitted with flights 8 of any suitable cross sectional shape, as is usual in bean polishing drums, and a charging door 9 that extends lengthwise the drum.

One or more stationary screens 10 are arranged lengthwise the drum and downwardly inclined from shaft 2, as shown in Fig. 2. The screen is coarse enough to allow the granular polishing material to pass through, but fine enough to prevent the whole beans that are to be dried and polished from passing through the meshes.

Means is provided for supplying at will to an end of the tubular shaft 2 air of any suitable degree of humidity or temperature. A preferred arrangement of devices for controlling and regulating the air supply is shown diagrammatically in Fig. 1. Cold air is supplied to the intake end of tubular shaft 2 through a pipe 11, and warm air is supplied through pipe 12, fitted with a valve or damper 13. Connected in pipe 12 is an air heater 14 of any suitable construction. The cold air pipe 11 and the warm air pipe 12 take their supply from a blower or impeller fan 15, and the air delivered from the fan can be directed into heater 14, or by-passed around it through pipe 11, by properly manipulating the dampers 13, 16, 17.

The air inlet to the blower is indicated by numeral 18, and 19 designates a belt or other suitable driving means. Atmospheric air can be supplied to the blower through valved pipe 20, and humidified air comes from air washer 21, which is equipped with the usual air inlet 22, valved outlet 23 and spray nozzle 24.

The operation of the combined drying and polishing machine is as follows:

Drum 1, having been supplied with granular material, such as split beans that have been ground up and screened to size, and having also been supplied with beans to be dried and polished, by way of charging door 9, is revolved around the stationary tubular shaft 2 by gear 3. The lower ends of the air-discharge nozzles 5 have fingers 5ª that preferably project into the material to interrupt and stir the mass near the bottom of the revolving drum and thereby subject it more completely to the action of the air blast. Some of the beans and polishing material is carried up with the flights 8 at each revolution of the drum, as indicated by the arrow in Fig. 2, and is slowly poured back upon the upper surface of one or more downwardly inclined screens 10, thereby bringing it into intimate contact with the conditioned air blast during a longer time interval. The whole beans run off the end of the screens, while the smaller granular polishing material and the particles of dust and dirt from the clean beans sift through the screens. Dirt once separated from whole beans will not again adhere.

Meanwhile the nozzles 5 are discharging air upon or into the gently agitated material and as its dries the finer dust is floated up into the upper part of the drum and escapes by way of the air outlet 7, while the coarser particles continue to polish the whole beans during the continued operation of the machine.

Sometimes beans that are excessively dry are submitted for polishing. In that case it is advisable to slightly humidify them in order to prevent an excessive amount of splitting during the polishing operation. Air humidifier 21 is therefore provided, whereby the air before it reaches the blower 15 is suitably moistened and put into condition to quickly reduce the surface brittleness of the beans to be polished.

In case beans are supplied to the machine in too moist condition the incoming air is preheated by means of the heater 14. If the beans are in condition to be suitably treated by atmospheric air it can be supplied through pipe 11, the heater being by-passed by properly adjusting the valves 13, 16, 17.

When the drying and polishing operation is completed the finished batch of material is removed from the drum and the machine is then ready for a new supply.

Having thus described my invention, what I claim and desire to secure by Letters Patent is:

1. In a machine for simultaneously drying and polishing beans and the like, a revolvable drum for containing the beans and granular polishing material, a charging door in said drum, a stationary tubular shaft extending axially through said drum, a number of downwardly directed air-discharge nozzles connected to said shaft and extending toward the lower periphery of said drum and said material, means for supplying at will air of any suitable degree of humidity or temperature to an end of said tubular shaft, said means comprising a blower and means for supplying artificially humidified air or atmospheric air to said blower and an air-heating means interposed between said blower and said tubular shaft, the other end of said tubular shaft having a tube extending upwardly and comprising an air and vapor outlet from said drum, partitioning means in said shaft for separating said air inlet and outlet, and a stationary screen downwardly inclined from said shaft within the drum.

2. In a machine for simultaneously drying and polishing beans and the like, a revolvable drum for containing the beans and granular polishing material, a charging door in said drum, a stationary tubular shaft extending axially through said drum, a number of downwardly directed air-discharge nozzles connected to said shaft and extending toward the lower periphery of said drum and said material, means for supplying at will air of any suitable degree of humidity or temperature, to an end of said tubular shaft, the other end of said tubular shaft having a tube extending into the upper part of said drum and comprising an air and vapor outlet from said drum, partitioning means in said shaft for separating said air inlet and outlet, and stationary screens downwardly inclined from said shaft within the drum.

3. In a machine for simultaneously drying and polishing beans and the like, a revolvable drum for containing the beans and a supply of granular polishing material, a charging door in said drum, a stationary tubular shaft extending axially through said drum, a number of downwardly directed air discharge nozzles connected to said shaft and extending nearly to the lower periphery of said drum, means for supplying at will air of any suitable degree of humidity or temperature to an end of said tubular shaft, the other end of said tubular shaft having an upwardly directed opening comprising an air and vapor outlet from said drum, partitioning means in said shaft for separating said air inlet and outlet, and a stationary screen within the drum.

4. In a machine for simultaneously drying and polishing beans and the like, a revolvable drum for containing the beans and a supply of granular polishing material, a charging door in said drum, a stationary tubular shaft extending through said drum, a number of downwardly directed air discharge openings in said shaft, means for supplying at will air of any suitable degree of temperature to said tubular shaft, an end of said tubular shaft having an opening comprising an air and vapor outlet from said drum, partitioning means in said shaft for separating the said air inlet and outlet, and a stationary screen within the drum.

5. In a machine for simultaneously drying and polishing beans and the like, a revolvable drum for containing the beans and a supply of granular polishing material, a charging door in said drum, a stationary tubular shaft extending into said drum, a number of downwardly directed air discharge openings in said shaft, means for supplying at will air of any suitable degree of temperature to said tubular shaft, and an air and vapor outlet from said drum.

6. A machine constructed as set forth in claim 5 having flights secured to the inner periphery of said drum for lifting material, and a downwardly inclined screen within the drum to receive material lifted by said flights.

In testimony whereof, I affix my signature.

JOHN McFARLAND.